United States Patent
Griepentrog

(10) Patent No.: US 6,313,639 B1
(45) Date of Patent: Nov. 6, 2001

(54) METHOD AND CONFIGURATION FOR IDENTIFYING SHORT CIRCUITS IN LOW-VOLTAGE NETWORKS

(75) Inventor: Gerd Griepentrog, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/480,759

(22) Filed: Jan. 10, 2000

Related U.S. Application Data

(63) Continuation of application No. PCT/DE98/01884, filed on Jul. 8, 1998.

(30) Foreign Application Priority Data

Jul. 10, 1997 (DE) .............................................. 197 29 599

(51) Int. Cl.[7] .......................... G01R 31/00; G01R 31/14; G08B 21/00
(52) U.S. Cl. .......................... 324/500; 324/509; 324/510; 324/522; 324/541; 324/72; 324/76.11; 324/76.12; 324/126; 340/650
(58) Field of Search ................................... 324/72, 76.11, 324/76.12, 500, 509, 510, 522, 541, 126; 340/650

(56) References Cited

U.S. PATENT DOCUMENTS

| | | | | |
|---|---|---|---|---|
| 5,386,095 | * | 1/1995 | Kaneko et al. | 219/69.18 |
| 5,473,244 | * | 12/1995 | Libove et al. | 324/126 |
| 5,481,194 | * | 1/1996 | Schantz et al. | 324/522 |
| 5,534,675 | * | 7/1996 | Kaneko et al. | 219/69.13 |

FOREIGN PATENT DOCUMENTS

| | | |
|---|---|---|
| 36 42 136 A1 | 6/1988 | (DE) . |
| 36 42 136 C2 | 11/1989 | (DE) . |
| 0 838 887 A2 | 4/1998 | (EP) . |

OTHER PUBLICATIONS

Giandomenico Rivetti et al.: "Intelligenz in Niederspannungs–Leistungsschaltern" [intelligence in low voltage power switches], ABB Technik Apr. 1997, pp. 41–46, XP–002086696.

Martin Lindmayer et al.: "Digitale Algorithmen zur frühzeitigen Kurzschlusserkennung" [digital algorithms for early detection of short circuits], etz vol. 112, No. 13/14, 1991, pp. 719–722.

* cited by examiner

*Primary Examiner*—Glenn W. Brown
*Assistant Examiner*—Wasseem H. Hamdan
(74) *Attorney, Agent, or Firm*—Herbert L. Lerner; Laurence A. Greenberg; Werner H. Stemer

(57) ABSTRACT

A method for identifying short circuits in a low-voltage network includes the step of determining a first envelope and a second envelope for a plurality of locus curves of a current steepness as a function of a current in a low voltage network, the first and second envelopes including all switching angles, the first envelope being determined for a lower power factor, the second envelope being determined for an upper power factor. Additionally a third envelope is determined taking into account rated-current switching operations between the lower power factor and the upper power factor. A resultant envelope is formed from a combination of the first, second, and third envelopes by overlaying the first, second, and third envelopes. The resultant envelope defines a tolerant locus curve criterion indicating a short circuit for values outside the tolerant locus curve criterion. A configuration for identifying short circuits is also provided.

12 Claims, 4 Drawing Sheets

METHOD AND CONFIGURATION FOR IDENTIFYING SHORT CIRCUITS IN LOW-VOLTAGE NETWORKS

CROSS REFERENCE TO RELATED APPLICATION

This application is a continuation of copending International Application PCT/DE98/01884, filed Jul. 8, 1998, which designated the United States.

BACKGROUND OF THE INVENTION

Field of the Invention

The invention relates to a method for identifying short circuits in low-voltage networks using selected switching criteria. In addition, the invention also relates to an associated configurations for carrying out the method.

Short circuits in low-voltage (LV) systems result in high electrodynamic and thermal stresses both on the downstream system parts, such as conductor lines, cables, busbar systems or the like, and on the power breaker or circuit breaker which carries out the disconnection. The amount of stress is governed primarily by the time period from the occurrence of the short circuit until it is cut off. A part of this time is required purely for detecting the unacceptable operating state, this is referred to as the so-called short-circuit identification time. The aim is to find a method which is tolerant to various network parameters, in particular the power factor, and which allows short circuits to be identified quickly.

A range of methods for a short-circuit identification have already been proposed:

Conventionally, the magnitude of the current i is assessed by magnetic and/or thermal releases or triggers, and a disconnection is triggered (i-criterion) if a limit is exceeded. Since the current through the network inductances is continuous, a certain time period always passes before the current rises above the limit and the short circuit is thus identified. A further disadvantage is that it is necessary to set a limit well above (in practice by a factor of $\geq 3$) the rated root-mean-square current based on the surge factor $\kappa$, in order to prevent an inadvertent tripping. In consequence, it is possible that "weak" short circuits will never be identified. An additional delay occurs as a result of the mechanical and, in particular, thermal inertia of the releases r trigger devices. In order to compensate for this, numerous electronic releases heave been configured on the basis of an exclusive current assessment (i-criterion), which compare the actual current to the tripping limit with no inertia or with little inertia.

An algorithm is proposed in the reference etz 112 (1991), pages 718 to 722 which, in addition to the current i, also uses the current steepness di/dt for identifying a short circuit. Tripping takes place when the following condition, which is called an extrapolation criterion, is satisfied:

$$\frac{1}{I_N} \cdot \left| i + \tau_N \cdot \frac{di}{dt} \right| > G_{Extra} = \frac{\sqrt{2}}{\cos\varphi_N} \Rightarrow \text{short circuit} \quad (1)$$

where $I_N$: is the rated current (root mean square value),
$\varphi_N$: is the phase shift in the rated current circuit,
$\tau_N$: is the time constant of the rated current circuit with $\tau_N = \tan(\varphi_N)/(2\pi f)$, and $G_{extra}$: is the tripping limit.

On a graph with current i as the abscissa and the current steepness di/dt as the ordinate, equation (1) defined above represents a straight line.

In comparison with all other known methods, which use the current i and current steepness di/dt for identifying short circuits, the extrapolation criterion is optimal for the identification characteristics such as the identification time, the current heating integral, and the current at the identification time. The extrapolation criterion has a stable reaction with regard to switching the current level within the permissible limits.

A disadvantage of this method is that the power factor in the rated operation of the network to be protected must be known for an adaptation of the method. This requires that the network conditions are known and do not change since, if the load varies, the method will be incorrectly matched and may result in an inadvertent or unauthorized tripping.

A method which is insensitive to different power factors within certain interval limits and likewise uses the current and current steepness for a short-circuit identification is described in the Geriuan patent DE 36 42 136 C1. All the possible combinations of currents and current steepnesses which can occur when a circuit is switched on at power factors of, for example, cos $\phi$=0.2 . . . 0.95 are plotted as locus curves in a common diagram, that is to say the current i on the abscissa and the current steepness di/dt on the ordinate. Since, in the German patent DE 36 42 136 C2, all the locus curves start on the ordinate where i is equal to zero, it must be assumed that no current was flowing before the switching operation, and, in consequence, that no initial current is present. Consequently, an envelope is produced around the resultant family of curves, which is declared as a so-called threshold value function. However, no rule for composing the envelope is defined in the German patent DE 36 42 136 C1. If an observation point, which is expressed by the pair of values current/current steepness, leaves the region bounded by the threshold value function, this leads to a tripping.

The German patent DE 36 42 136 C1 cannot take into account those switching processes in which an initial current was flowing, that is to say a so-called changeover takes place, wherein the power factor and/or current change within permissible limits as a result of the switching operation. These operation conditions, which in practice occur with a high probability, can, under certain circumstances and at specific switching phase angles, cause an unjustifiable tripping of the switching device for carrying out the method described in the German patent DE 36 42 136 C1.

Furthermore, the article in the reference ABB Technik 4/1997, page 41 proposes that disconnection criteria for low-voltage switches be developed further through the use of suitable algorithms in order to detect any short circuit which occurs in the microsecond range. The aim is, when a fault occurs in electrical distribution networks with low-voltage systems, to isolate the fault as quickly as possible and to isolate only the faulty part of the system, as well as limiting the down time and the damage to a minimum.

SUMMARY OF THE INVENTION

It is accordingly an object of the invention to provide a method and a configuration for identifying short circuits in low-voltage networks which overcome the above-mentioned disadvantages of the heretofore-known methods and configurations of this general type and which guarantee a stable operation for the identification of short circuits under all conceivable operating conditions.

With the foregoing and other objects in view there is provided, in accordance with the invention, a method for identifying short circuits in low-voltage networks. The method includes the steps of determining a first envelope and a second envelops for a plurality of locus curves of a current steepness as a function of a current in a low voltage network, the first and second envelopes including all switching angles, the first envelope being determined for a lower power factor, the second envelope being determined for an upper power factor; additionally determining a third envelope taking into account rated-current switching operations between the lower power factor and the upper power factor; forming a resultant envelope from a combination of the first, second, and third envelopes by overlaying the first, second, and third envelopes, the resultant envelope defining a tolerant locus curve criterion indicating a short circuit for values of at least one of the current steepness and the current outside the tolerant locus curve criterion, the tolerant locus curve criterion being independent of power factors and independent of an initial current; and detecting at least one of an instantaneous current value and an instantaneous current steepness value for use as a disconnection criterion.

In accordance with another mode of the invention, the disconnection criterion is simplified by expanding extrapolation criteria and the short circuit is identified when the extrapolation criteria are satisfied for both limits of a power factor interval defined by the lower and upper power factors, subject to the following equations:

$$\frac{1}{I_N} \cdot \left| i + \max(\tau_N) \cdot \frac{di}{dt} \right| > \max(G_{Extra}) = \frac{\sqrt{2}}{\min(\cos\varphi_N)}$$

and $$\frac{1}{I_N} \cdot \left| i + \min(\tau_N) \cdot \frac{di}{dt} \right| > \min(G_{Extra}) = \frac{\sqrt{2}}{\max(\cos\varphi_N)}$$

where
   i: is the current,
   di/dt: is the current steepness,
   $I_N$: is a rated current as a root mean square value,
   $\phi_N$: is a phase shift in a rated current circuit,
   $\tau_N$: is a time constant of the rated current circuit where $\tau_N$=tan ($\phi_N$)/($2\pi f$) with f being a network frequency, and
   $G_{extra}$: is a tripping limit.

In accordance with yet another mode of the invention, the disconnection criterion is simplified by approximating the resultant envelope with a polygon-shaped envelope.

In accordance with a further mode of the invention, the polygon-shaped envelope is formed from tangents having tangent points at significant points of the resultant envelope.

In accordance with yet a further mode of the invention, the significant points are a maximum current value and a minimum current value of the resultant envelope, an intersection point of extrapolation criteria resulting from the lower and the upper power factors, a maximum current steepness and a point-symmetrical projection, or alternatively a mirror-symmetrical projection, of the intersection point and the maximum current steepness.

In accordance with another mode of the invention, coordinates of the maximum and minimum current values are determined from the mathematical expression $\kappa \cdot \sqrt{2} \cdot I_{rated}$, where $\kappa$ represents a surge factor related to the lower power factor and $I_{rated}$ is a rated current.

In accordance with an added mode of the invention, the intersection point of the extrapolation criteria resulting from the lower and upper power factors are determined from the following relationships:

$$\frac{I_2}{I_N} = \sqrt{2} \cdot \frac{\sin\varphi_u - \sin\varphi_o}{\sin(\varphi_u - \varphi_o)}$$

and $$\frac{(dI/dt)_2}{\omega \cdot I_N} = \frac{\sqrt{2}}{\sin\varphi_u} - \frac{I_2}{I_N \cdot \tan\varphi_u}$$

where
   $(dI/dt)_2$: is a current steepness at an intersection of two straight extrapolation lines,
   $I_2$: is a current at the intersection of the two straight extrapolation lines,
   $I_N$: is a rated current as a root mean square value,
   $\omega$: is a network circular frequency,
   $\phi_u$: is a phase shift between the current and a voltage when using the lower power factor, and
   $\phi_o$: is a phase shift between the current and the voltage when using the upper power factor.

In accordance with another mode of the invention, the maximum current steepness is determined with the following relationships:

for $2 \cdot \cos\phi_u < \cos\phi_o$ $$\frac{(dI/dt)_3}{\omega \cdot I_N} = \frac{\sqrt{2} \cdot [\sin\psi_{max} - \cos\varphi_o \cdot \sin(\psi_{max} - \varphi_u)]}{\sin\varphi_o}$$

$$\frac{I_3}{I_N} = \frac{\sqrt{2}}{\cos\varphi_o} - \frac{(dI/dt)_3}{\omega \cdot I_N} \cdot \frac{1}{\tan\varphi_o}$$

and for $2 \cdot \cos\phi_u \geq \cos\phi_o$ $$\frac{(dI/dt)_3}{\omega \cdot I_N} = \frac{\sqrt{2}}{\sin\varphi_o}$$

$$\frac{I_3}{I_N} = \frac{\sqrt{2}}{\cos\varphi_o} - \frac{(dI/dt)_3}{\omega \cdot I_N} \cdot \frac{1}{\tan\varphi_o}$$

where
   $(dI/dt)_3$: is the maximum current steepness,
   $I_3$: is the current at the maximum current steepness, $\psi_{max}$: is a switching angle, related to the voltage, with a subsequent maximum current steepness in accordance with $$\psi_{max} = \arctan\left(\frac{1 - \cos\varphi_0 \cdot \cos\varphi_u}{\cos\varphi_o \cdot \sin\varphi_u}\right)$$

where
   $\phi_u$: is a phase shift between the current and a voltage when using the lower power factor, and
   $\phi_o$: is a phase shift between the current and the voltage when using the upper power factor.

In other words, the object of the invention is achieved with a method for identifying short circuits in low-voltage networks using selected switching criteria, in which case, in particular, the instantaneous value of the current and the current steepness are detected and are used as disconnection criteria, for which purpose the current steepness is represented as a function of the current and, using this locus curve representation, envelopes are derived which enclose all the locus curves which are possible in normal operation, in which case a resultant envelope is formed by superimposing the envelopes, which, in addition to various switching times and power factors, takes account of any required initial current within the normal operating range, for which purpose first of all, separate envelopes are formed for the lower power factor on the one hand, and the upper power factor on the other hand, with all the switching angles being enclosed in each case, in addition, a further envelope is determined which takes account of the rated-current switching operations between two power factor limits, the envelopes obtained in this way are combined and are superimposed to form the resultant envelope which embodies a "Tolerant Locus Curve Criterion" (TLC) which is independent of the power factor and initial current, and a short circuit is indicated if the values are outside the tolerance locus curve criterion.

With the objects of the invention in view there is also provided, a configuration for identifying a short circuit in a low voltage network, the configuration including a sensor for detecting a current steepness; a filter connected to the sensor; an analog-digital converter connected to the filter; a level matching unit connected to the analog-digital converter for generating a first signal representing the current steepness; an adder unit connected to the level matching unit, the adder unit generating a second signal representing an instantaneous value of a current; and a digitally operating evaluation unit connected to the level matching unit, the evaluation unit receiving the first and second signals and storing a tolerant locus curve criterion, the tolerant locus curve criterion indicating a short circuit for values of at least one of the first and second signals outside the tolerant locus curve criterion, the tolerant locus curve criterion being defined by a resultant envelope formed from a combination of a first, a second, and a third envelope, the first envelope and the second envelope being determined from a plurality of locus curves of the current steepness as a function of the current in a low voltage network, the first and second envelopes including all switching angles, the first envelope being determined for a lower power factor, the second envelope being determined for an upper power factor, the third envelope taking into account rated-current switching operations between the lower power factor and the upper power factor.

In accordance with further features of the invention, the sensor for measuring the current steepness may be embodied as a uniform-field coil, and the filter is an anti-aliasing filter.

In accordance with another feature of the invention, a release is connected to the evaluation unit and is actuated by the evaluation unit.

The configuration for carrying out the method uses evaluation devices which are configured in analog, digital and/or hybrid form.

The described method provides an algorithm which advantageously operates in all conceivable types of operation and which, apart from the power factor of the network to be protected, is also independent of previous switching operations. This results in considerably better characteristics than those obtained with conventional methods.

Associated configurations having devices for carrying out the method according to the invention may alternatively operate using analog, digital or hybrid evaluation devices. In particular, one advantageous configuration has a sensor for measuring the current steepness, downstream from which a filter, an analog/digital converter and a unit for level matching or level adaptation are connected, from which a first signal for the current steepness and, via an adder unit, a second signal for the instantaneous value of the current are passed to a digitally operating evaluation unit having a tolerant-locus-curve criterion stored in it. A release for the respectively used switch is actuated by the evaluation unit.

Other features which are considered as characteristic for the invention are set forth in the appended claims.

Although the invention is illustrated and described herein as embodied in a method and a configuration for identifying short circuits in low-voltage networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
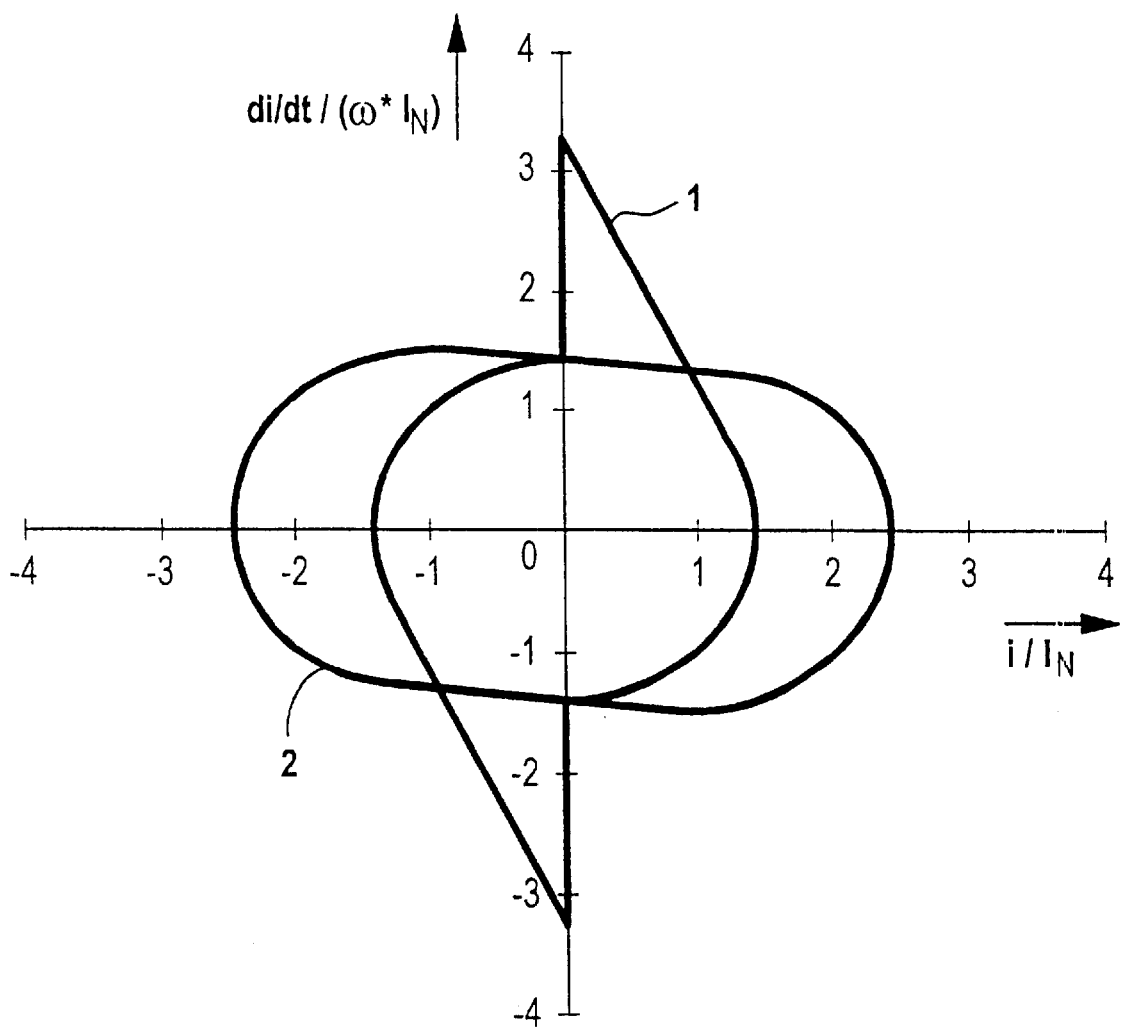
FIG. 1 is a graph of the locus curve envelopes for different power factors.
Figure 2:
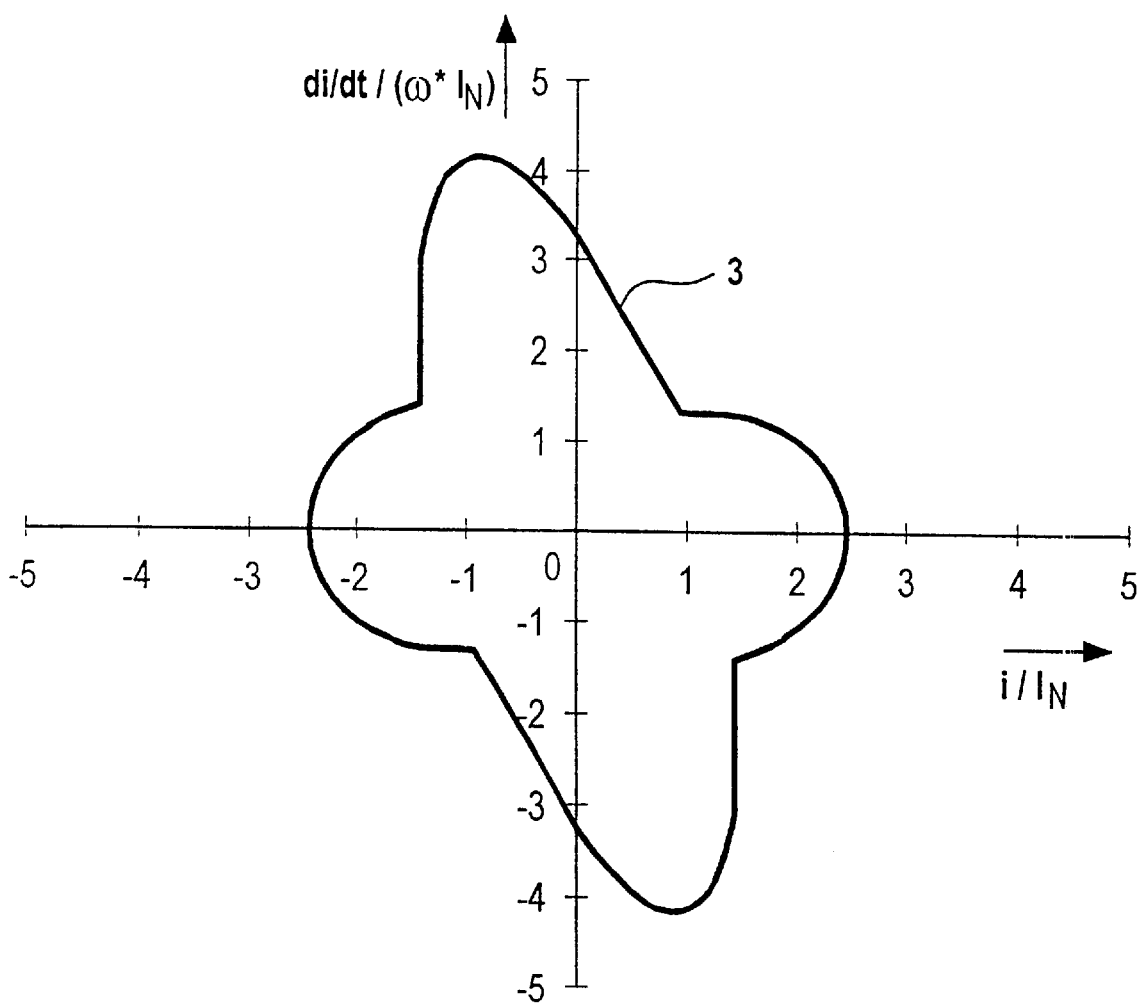
FIG. 2 is a graph of the resulting envelope for a tolerant locus curve criterion.
Figure 3:
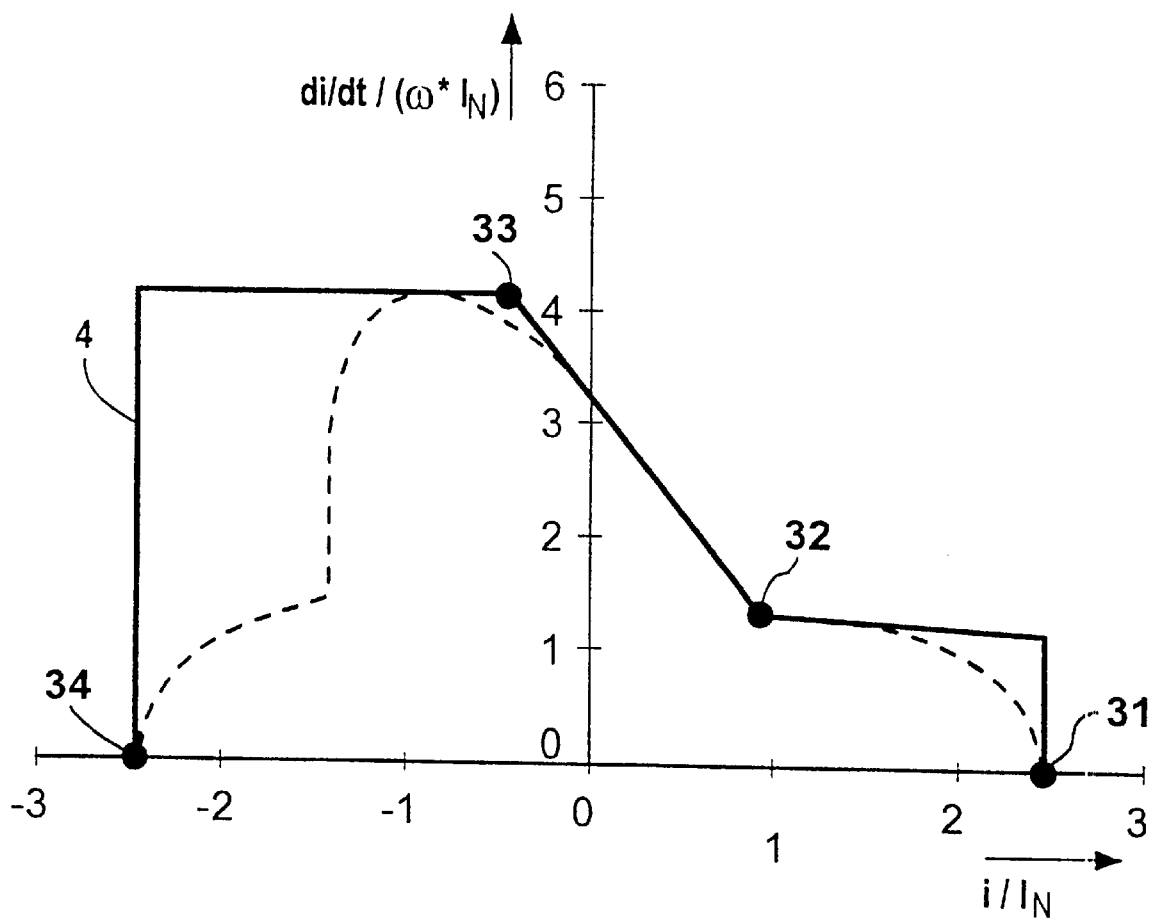
FIG. 3 is a graph illustrating a simplified disconnection criterion provided by a polygon.
Figure 4:
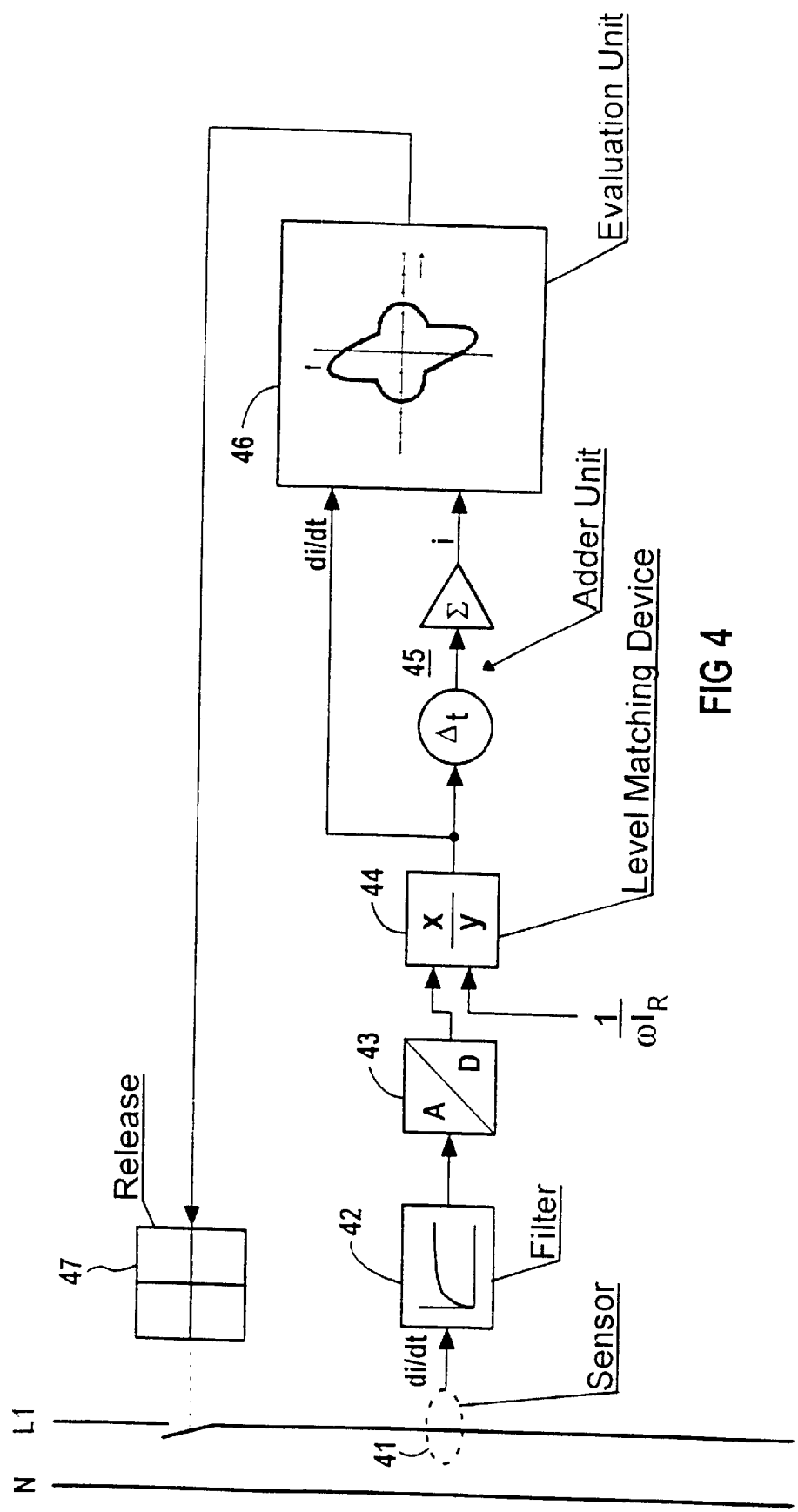
FIG. 4 is a schematic block diagram of a circuit configuration providing an early short-circuit identification using the tolerant locus curve criterion.

Referring now to the figures of the drawings in detail and first, particularly, to FIGS. 1 and 2, which will partially be described together. FIGS. 1 and 2 are in particular used to describe the novel method and to indicate the improvement over the prior art. FIG. 3 is used to describe a simplified disconnection criterion while FIG. 4 shows a practical implementation of the method according to the invention.

The invention assumes that the power factor of the network to be protected remains in a specific interval (for example, cos $\phi$=0.1 ... 0.9) during rated operation.

FIG. 1 shows an illustration of the envelopes 1 and 2, which are initially independent of one another, for switching on the rated current circuit, with the respective lower power factor (for example cos $\phi$=0.1) and an upper power factor (for example cos $\phi$=0.9). In FIG. 1, $1/I_n$ is plotted on the abscissa, and $1/(\omega \cdot I_n) \cdot di/dt$ on the ordinate.

If all possible combinations of current and current steepness (locus curves on the i-di/dt graph) are then considered which occur when switching on the rated current circuit at various power factors, changing the power factor during the rated operation, varying the current level in the rated range, i.e. switching and as a result of these points being combined, then this includes all the operational situations which are possible in practice, and a resultant envelope 3 is obtained as the outer boundary of the family of locus curves. This resultant envelope is shown in FIG. 2, which, in a common envelope, takes into account not only all the locus curves for any arbitrary or desired switching angles, but also the envelopes resulting from this for various power factors.

If an i-di/dt operating point during a system operation is located outside the envelope formed in this way, then a short circuit must be present. Since this decision feature is now independent of the power factor and the initial current, within predetermined limits, it is referred to as a tolerant locus curve criterion (TLC criterion).

Detailed investigations have shown that the TLC criterion has the following characteristics:

the TLC criterion Ls better than the i-criterion in all ranges.

As the short-circuit current level rises, the TLC criterion approaches the extrapolation criterion for all power factors.

The TLC criterion and the extrapolation criterion hardly differ for power factors at the upper dimensioning limit of the TLC criterion and short-circuit currents where $I_K > 2 \cdot I_N$.

If the specific network relationships are known, it is possible for the TLC criterion to approach the extrapolation criterion by constraining the range of possible power factors.

The influence of harmonics in the network is compensated for by widening the envelope, although this results in a deterioration in the identification characteristics at the same time. One specific method for coping, in particular, with current peaks is not to identify a short circuit unless the operating point of the circuit infringes the TLC criterion for a specific time or a given number of sample values.

Expanding the extrapolation criterion results in a simplified variant of the TLC criterion. A short circuit is identified only if the extrapolation criterion is exceeded for both limits of the power factor interval, for example, cos φ=0.1 and 0.9. This can be formulated as follows:

$$\frac{1}{I_N} \cdot \left| i + \max(\tau_N) \cdot \frac{di}{dt} \right| > \max(G_{Extra}) = \frac{\sqrt{2}}{\min(\cos \varphi_N)} \quad (2a)$$

and $$\frac{1}{I_N} \cdot \left| i + \min(\tau_N) \cdot \frac{di}{dt} \right| > \min(G_{Extra}) = \frac{\sqrt{2}}{\max(\cos \varphi_N)} \quad (2b)$$

While the normal region of the original TLC criterion is located inside a complicated shape, only the two limit lines need be considered for the simplified TLC criterion. However, this simplification is associated with a minor deterioration in the identification characteristics.

In order to implement the simplified TLC criterion, the resultant envelope 3 as shown in FIG. 2 is approximated by a polygon 4. FIG. 3 shows such a polygonal approximation for the upper half plane. The polygonal approximation is completed by a centrally symmetrical mirroring onto the lower half plane.

The polygon 4 shown in FIG. 3 contains characteristic points. In this case, the current level of the point 31 or 34, respectively, related to the rated current, is given by the maximum/ minimum possible current, and this respective current level can be obtained by using the surge factor κ related to the lower power factor limit, point 32 is the intersection of the lines resulting from the two extrapolation criteria; the current level at the point 32 is given by:

$$\frac{I_2}{I_N} = \sqrt{2} \cdot \frac{\sin\varphi_u - \sin\varphi_o}{\sin(\varphi_u - \varphi_o)} \quad (3a)$$

the current steepness at the point 32 is given by:

$$\frac{(dI/dt)_2}{\omega \cdot I_N} = \frac{\sqrt{2}}{\sin\varphi_u} - \frac{I_2}{I_N \cdot \tan\varphi_u} \quad (3b)$$

where $(dI/dt)_2$: is the current steepness at the point 32, $I_2$: is the current level at the point 32, $\varphi_u$: is the phase shift at the lower power factor limit, and $\varphi_o$: is the phase shift at the upper power factor limit, point 33 is the position of the maximum current rise, whose current steepness is given by $$\frac{(dI/dt)_3}{\omega \cdot I_N} = \frac{\sqrt{2}}{\sin\varphi_o}$$

and $$\frac{(dI/dt)_3}{\omega \cdot I_N} = \frac{\sqrt{2} \cdot [\sin\psi_{max} - \cos\varphi_o \cdot \sin(\psi_{max} - \varphi_u)]}{\sin\varphi_o} \quad (4a)$$

for $2 \cdot \cos\varphi_u < \cos\varphi_o$ and whose current level is given by:

$$\frac{I_3}{I_N} = \frac{\sqrt{2}}{\cos\varphi_o} - \frac{(dI/dt)_3}{\omega \cdot I_N} \cdot \frac{1}{\tan\varphi_o} \quad (4b)$$

where $(dI/dt)_3$: is the current steepness at the point 33, $I_3$: is the current level at the point 33, $\psi_{max}$: is the switching angle, related to the network voltage, with subsequent maximum current steepness in accordance with $$\psi_{max} = \arctan\left(\frac{1 - \cos\varphi_o \cdot \cos\varphi_u}{\cos\varphi_o \cdot \sin\varphi_u}\right) \quad (5)$$

FIG. 4 shows a configuration for early short-circuit identification using the TLC criterion for any desired switching device, in detail. Conventional switching devices may be used to implement the described method. Appropriate configurations may operate fully in analog form, purely in digital form, or else in hybrid form, with the latter being preferred.

FIG. 4 shows a sensor 41, for example a uniform-field coil or Rogowski coil, for measuring the current steepness di/dt or the current level i. FIG. 4 also shows, an A/D converter 43 with an antialiasing filter 42 connected upstream of the A/D converter 43, a level matching unit 44 for simultaneously setting the rated current level, an adder unit 45 for calculating the current i from the current steepness di/dt or, alternatively, a differentiating unit for calculating the current steepness di/dt from the current level i, as well as a digitally operating evaluation unit 46 which compares the measured values with the TLC criterion and, if a short circuit is identified, actuates a release 47.

The configuration according to FIG. 4 may be used for rapid identification of short circuits in low-voltage networks in conjunction with any desired switches.

I claim:

1. A method for identifying short circuits in low-voltage networks, the method which comprises:

determining a first envelope and a second envelope for a plurality of locus curves of a current steepness as a function of a current in a low voltage network, the first and second envelopes including all switching angles, the first envelope being determined for a lower power factor, the second envelope being determined for an upper power factor;

additionally determining a third envelope taking into account rated-current switching operations between the lower power factor and the upper power factor;

forming a resultant envelope from a combination of the first, second, and third envelopes by overlaying the first, second, and third envelopes, the resultant envelope defining a tolerant locus curve criterion indicating a short circuit for values of at least one of the current steepness and the current outside the tolerant locus curve criterion, the tolerant locus curve criterion being independent of power factors and independent of an initial current; and detecting at least one of an instantaneous current value and an instantaneous current steepness value for use as a disconnection criterion.

2. The method according to claim 1, which comprises simplifying the disconnection criterion by expanding extrapolation criteria and identifying the short circuit when the extrapolation criteria are satisfied for both limits of a power factor interval defined by the lower and upper power factors, subject to the following equations:

$$\frac{1}{I_N} \cdot \left| i + \max(\tau_N) \cdot \frac{di}{dt} \right| > \max(G_{Extra}) = \frac{\sqrt{2}}{\min(\cos \varphi_N)}$$

and $$\frac{1}{I_N} \cdot \left| i + \min(\tau_N) \cdot \frac{di}{dt} \right| > \min(G_{Extra}) = \frac{\sqrt{2}}{\max(\cos \varphi_N)}$$

where i: is the current, di/dt: is the current steepness, $I_N$: is a rated current as a root mean square value, $\phi_N$: is a phase shift in a rated current circuit, $\tau_N$: is a time constant of the rated current circuit where $\tau_N$=tan $(\phi_N)/(2\pi f)$ with f being a network frequency, and $G_{extra}$: is a tripping limit.

3. The method according to claim 1, which comprises simplifying the disconnection criterion by approximating the resultant envelope with a polygon-shaped envelope.

4. The method according to claim 3, which comprises forming the polygon-shaped envelope from tangents having tangent points at significant points of the resultant envelope.

5. The method according to claim 4, which comprises using as the significant points a maximum current value and a minimum current value of the resultant envelope, an intersection point of extrapolation criteria resulting from the lower and the upper power factors, a maximum current steepness and a point-symmetrical projection of the intersection point and the maximum current steepness.

6. The method according to claim 5, which comprises determining coordinates of the maximum and minimum current values from the mathematical expression $\kappa \cdot \sqrt{2} \cdot I_{rated}$, where $\kappa$ represents a surge factor related to the lower power factor and $I_{rated}$ is a rated current.

7. The method according to claim 5, which comprises determining the intersection point of the extrapolation criteria resulting from the lower and upper power factors from the following relationships:

$$\frac{I_2}{I_N} = \sqrt{2} \cdot \frac{\sin\varphi_u - \sin\varphi_o}{\sin(\varphi_u - \varphi_o)}$$

and $$\frac{(dI/dt)_2}{\omega \cdot I_N} = \frac{\sqrt{2}}{\sin\varphi_u} - \frac{I_2}{I_N \cdot \tan\varphi_u}$$

where $(dI/dt)_2$: is a current steepness at an intersection of two straight extrapolation lines, $I_2$: is a current at the intersection of the two straight extrapolation lines, $I_N$: is a rated current as a root mean square value, $\omega$: is a network circular frequency, $\phi_u$: is a phase shift between the current and a voltage when using the lower power factor, and $\phi_o$: is a phase shift between the current and the voltage when using the upper power factor.

8. The method according to claim 5, which comprises determining the maximum current steepness with the following relationships:

for $2 \cdot \cos\phi_u < \cos\phi_o$ $$\frac{(dI/dt)_3}{\omega \cdot I_N} = \frac{\sqrt{2} \cdot [\sin\psi_{max} - \cos\varphi_o \cdot \sin(\psi_{max} - \varphi_u)]}{\sin\varphi_o}$$

$$\frac{I_3}{I_N} = \frac{\sqrt{2}}{\cos\varphi_o} - \frac{(dI/dt)_3}{\omega \cdot I_N} \cdot \frac{1}{\tan\varphi_o}$$

and for $2 \cdot \cos\phi_u > \cos\phi_o$ $$\frac{(dI/dt)_3}{\omega \cdot I_N} = \frac{\sqrt{2}}{\sin\varphi_o}$$

$$\frac{I_3}{I_N} = \frac{\sqrt{2}}{\cos\varphi_o} - \frac{(dI/dt)_3}{\omega \cdot I_N} \cdot \frac{1}{\tan\varphi_o}$$

where $(dI/dt)_3$: is the maximum current steepness, $I_3$: is the current at the maximum current steepness, $\psi_{max}$: is a switching angle, related to a voltage, with a subsequent maximum current steepness in accordance with $$\psi_{max} = \arctan\left(\frac{1 - \cos\varphi_0 \cdot \cos\varphi_u}{\cos\varphi_o \cdot \sin\varphi_u}\right)$$

where $\phi_u$: is a phase shift between the current and the voltage when using the lower power factor, and $\phi_o$: is a phase shift between the current and the voltage when using the upper power factor.

9. A configuration for identifying a short circuit in a low voltage network, comprising:

a sensor for detecting a current steepness;

a filter connected to said sensor;

an analog-digital converter connected to said filter;

a level matching unit connected to said analog-digital converter for generating a first signal representing the current steepness;

an adder unit connected to said level matching unit, said adder unit generating a second signal representing an instantaneous value of a current; and a digitally operating evaluation unit connected to said level matching unit, said evaluation unit receiving said first and second signals and storing a tolerant locus curve criterion, the tolerant locus curve criterion indicating a short circuit for values of at least one of the first and second signals outside the tolerant locus curve criterion, the tolerant locus curve criterion being defined by a resultant envelope formed from a combination of a first, a second, and a third envelope, the first envelope and the second envelope being determined from a plurality of locus curves of the current steepness as a function of the current in a low voltage network, the first and second envelopes including all switching angles, the first envelope being determined for a lower power factor, the second envelope being determined for an upper power factor, the third envelope taking into account rated-current switching operations between the lower power factor and the upper power factor.

10. The configuration according to claim 9, wherein said sensor for measuring the current steepness is a uniform-field coil.

11. The configuration according to claim 9, wherein said filter is an anti-aliasing filter.

12. The configuration according to claim 9, including a release connected to said evaluation unit and being actuated by said evaluation unit.

* * * * *